US012710322B2

(12) United States Patent
Morimoto et al.

(10) Patent No.: US 12,710,322 B2
(45) Date of Patent: Aug. 18, 2026

(54) PASSIVE CAPACITIVE-BASED WIRELESS FORCE SENSOR

(71) Applicant: The Regents of the University of California, Oakland, CA (US)

(72) Inventors: Tania Morimoto, La Jolla, CA (US); Cédric Girerd, La Jolla, CA (US); Daegue Park, La Jolla, CA (US); Dinesh Bharadia, La Jolla, CA (US); Agrim Gupta, La Jolla, CA (US); Shayaun Bashar, La Jolla, CA (US); Nagarjun Bhat, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 393 days.

(21) Appl. No.: 18/337,272

(22) Filed: Jun. 19, 2023

(65) Prior Publication Data

US 2024/0418582 A1 Dec. 19, 2024

(51) Int. Cl.
*G01L 1/14* (2006.01)

(52) U.S. Cl.
CPC .................................... *G01L 1/144* (2013.01)

(58) Field of Classification Search
CPC ........................................................ G01L 1/144
USPC ........................................................... 73/304
See application file for complete search history.

(56) References Cited

U.S. PATENT DOCUMENTS

| | | | | |
|---|---|---|---|---|
| 7,038,470 B1 * | 5/2006 | Johnson | ............... | G01N 27/226 250/390.05 |
| 9,778,117 B2 * | 10/2017 | Pagani | .................... | G01L 1/148 |
| 2015/0015275 A1 * | 1/2015 | Huang | ................ | G01M 5/0033 324/633 |
| 2018/0081467 A1 * | 3/2018 | Jiang | .................... | H03K 17/975 |
| 2019/0326501 A1 * | 10/2019 | Gilbert | .................... | C04B 35/45 |
| 2022/0221350 A1 * | 7/2022 | Lynch | .................... | H05K 1/162 |
| 2024/0272021 A1 * | 8/2024 | Nesser | .................. | G01B 21/32 |

OTHER PUBLICATIONS

Huang et al., "LC Passive Wireless Sensors Toward a Wireless Sensing Platform: Status, Prospects, and Challenges," Journal of Microelectromechanical Systems, 2016, pp. 822-841, vol. 25, No. 5, IEEE.

Li et al., "Review of Research Status and Development Trends of Wireless Passive LC Resonant Sensors for Harsh Environments," Sensors, 2015, pp. 13097-13109, vol. 15, MDPI.

Humphries et al., "Passive, Wireless SAW OFC Strain Sensor," 2012 IEEE International Frequency Control Symposium Proceedings, 2012, pp. 1-6, IEEE.

Li et al., "IDSense: A Human Object Interaction Detection System Based on Passive UHF RFID," Automation and Interactive Feedback, 2015, pp. 2555-2564, CHI 2015.

(Continued)

*Primary Examiner* — Peter J Macchiarolo
*Assistant Examiner* — Monica S Young
(74) *Attorney, Agent, or Firm* — Greer, Burns & Crain, Ltd.; Steven P. Fallon

(57) ABSTRACT

A preferred embodiment provides a deformable passive force sensor that induces a change in an interrogation RF signal present on a conductive connection to produce a changed reflective signal and an ID circuit that responds with an ID and the changed reflective signal.

21 Claims, 7 Drawing Sheets

(56) References Cited

OTHER PUBLICATIONS

Li et al., "A Miniature Layered SAW Contact Stress Sensor for Operation in Cramped Metallic Slits," Instruments and Experimental Techniques, 2018, pp. 610-617, vol. 61, No. 4, Pleiades Publishing, Ltd.
Lou et al., "A Wireless Load Measurement Tool for Spine Surgery," ITMC 2005—Instrumentation and Measurement Technology Conference, 2005, pp. 1813-1817, IEEE.
Noh et al., "A Contact Force Sensor Based on S-Shaped Beams and Optoelectronic Sensors for Flexible Manipulators for Minimally Invasive Surgery (MIS)," IEEE Sensors Journal, 2020, vol. 20, No. 7, IEEE.
Noh et al., "Multi-Axis Force/Torque Sensor Based on Simply-Supported Beam and Optoelectronics," Sensors, 2016, pp. 1-22, vol. 16, No. 1936, MDPI.
Noh et al., "A Continuum Body Force Sensor Designed for Flexible Surgical Robotics Devices," 2014 36th Annual International Conference of the IEEE Engineering in Medicine and Biology Society, 2014, pp. 3711-3714, IEEE.
Shi et al., "Shape Sensing Techniques for Continuum Robots in Minimally Invasive Surgery: A Survey," IEEE Transactions on Biomedical Engineering, 2017, pp. 1665-1678, vol. 64, No. 8, IEEE.
Ryu et al., "FBG-based Shape Sensing Tubes for Continuum Robots, " 2014 IEEE International Conference on Robotics & Automation (ICRA), 2014, pp. 3531-3537, IEEE.
Tan et al., "A wireless, passive strain sensor based on the harmonic response of magnetically soft materials," Smart Materials and Structures, 2008, pp. 1-6, vol. 17, No. 025015, IOP Publishing.
Yi et al., "Passive wireless smart-skin sensor using RFID-based folded patch antennas," International Journal of Smart and Nano Materials, 2011, pp. 22-38, vol. 2, No. 1, Taylor & Francis.
Taffoni et al., "Optical Fiber-Based MR-Compatible Sensors for Medical Applications: An Overview," Sensors, 2013, pp. 14105-14120, vol. 13, MDPI.
Xu et al., "Curvature, Torsion, and Force Sensing in Continuum Robots Using Helically Wrapped FBG Sensors," IEEE Robotics and Automation Letters, 2016, pp. 1052-1059, vol. 1, No. 2, IEEE.
Thai et al., "Design of a Highly Sensitive Wireless Passive RF Strain Transducer," 2011 IEEE MTT-S International Microwave Symposium, 2011, pp. 1-4, IEEE.
Pradhan et al., "RIO: A Pervasive RFID-based Touch Gesture Interface," MobiCom '17, 2017, pp. 261-274, Association for Computing Machinery.
Chen et al., "Novel, Flexible, and Ultrathin Pressure Feedback Sensor for Miniaturized Intraventricular Neurosurgery Robotic Tools," IEEE Transactions on Industrial Electronics, 2021, pp. 4415-4425, vol. 68, No. 5, IEEE.
Okamura et al., "Haptic feedback in robot-assisted minimally invasive surgery," Current Opinion in Urology, 2009, pp. 102-107, vol. 19, No. 1, Wolters Kluwer.
Polygerinos et al., "MRI-Compatible Fiber-Optic Force Sensors for Catheterization Procedures," IEEE Sensors Journal, 2010, pp. 1598-1608, vol. 10, No. 10, IEEE.

* cited by examiner

PASSIVE CAPACITIVE-BASED WIRELESS FORCE SENSOR

STATEMENT OF GOVERNMENT INTEREST

This invention was made with government support under 1935329 awarded by the National Science Foundation. The government has certain rights in the invention.

FIELD

Fields of the invention include force sensing transducers, wireless communications, and robotics.

BACKGROUND

Minimally invasive surgical devices and robots are example tools that can benefit from force sensing. Force sensing allows a robot to detect contact with objects, as well as grasp and manipulate delicate objects if the force sensing is sensitive enough. Despite its many benefits, teleoperated robot-assisted minimally invasive surgery is limited by the inability of current instruments to sense forces applied during surgery. See, A. M. Okamura, "Haptic feedback in robot-assisted minimally invasive surgery," Current opinion in urology, vol. 19, no. 1, p. 102, 2009. Surgeons typically rely upon visual feedback, which only provides indirect evidence of applied forces.

Adding force sensing at the tip of a surgical robot or a minimally invasive surgical tool would provide an important tool to reduce the risk of injury. Sensing forces along any portion of the tool or robot that interacts with the patient would also provide valuable information to increase the safety and efficiency of surgical procedures.

Similarly, robot capabilities and human interaction safety would be increased by more sensitive force sensing. The ability of a robot to sensitively sense the force it applies to an object or animal directly affects the scope of possible operations for the robot.

One proposed device for the mechanics of loads transmitted to the spine during scoliosis corrective surgery includes instrumented hooks and screws, and a wireless data acquisition system to measure the loads and moments imposed during scoliosis surgery. E. Lou et al, "A wireless load measurement tool for spine surgery," in 2005 IEEE Instrumentation and Measurement Technology Conference Proceedings, vol. 3, 2005, pp. 1813-1817. This device integrates a standard strain gauge force sensor to regular RF transceivers. Such an arrangement requires power hungry electronic components such as analog to digital converters and RF signal modulators.

Some technologies have been proposed to provide force sensing feedback along the length of minimally invasive surgical tools. Continuum robots are small (diameters as small as 1 millimeter), continuously bending, flexible structures that are especially well-suited for minimally-invasive surgery. Current approaches for sensing forces along the length of these robots include:

Optical fibers. See, P. Polygerinos, et al, "Mri-compatible fiber-optic force sensors for catheterization procedures," IEEE Sensors Journal, vol. 10, no. 10, pp. 1598-1608, 2010; F. Taffoni, et al, "Optical fiber-based mr-compatible sensors for medical applications: An overview," Sensors, vol. 13, no. 10, pp. 14 105-14 120, 2013; C. Shi, X et al, "Shape sensing techniques for continuum robots in minimally invasive surgery: A survey," IEEE Transactions on Biomedical Engineering, vol. 64, no. 8, pp. 1665-1678 August 2017;

Light intensity modulation. See, Y. Noh, et al, "A three-axial body force sensor for flexible manipulators," in 2014 IEEE International Conference on Robotics and Automation (ICRA), 2014, pp. 6388-6393; Y. Noh, et al, "A continuum body force sensor designed for flexible surgical robotics devices," in 2014 36th Annual International Conference of the IEEE Engineering in Medicine and Biology Society. IEEE, 2014, pp. 3711-3714; Y. Noh, et al, "Multi-axis force/torque sensor based on simply-supported beam and optoelectronics," Sensors, vol. 16, no. 11, p. 1936, 2016; Y. Noh, et al, "A contact force sensor based on s-shaped beams and optoelectronic sensors for flexible manipulators for minimally invasive surgery (mis)," IEEE Sensors Journal, vol. 20, no. 7, pp. 3487-3495, 2020.

Published approaches also include Fabry-Perot interferometers and Fiber Bragg Grating (FBG) methods. See, S. C. Ryu and P. E. Dupont, "Fbg-based shape sensing tubes for continuum robots," in 2014 IEEE International Conference on Robotics and Automation (ICRA), 2014, pp. 3531-3537; R. Xu, et al, "Curvature, torsion, and force sensing in continuum robots using helically wrapped fbg sensors," IEEE Robotics and Automation Letters, vol. 1, no. 2, pp. 1052-1059, 2016. These sensors can be costly due to the optical components. The sensors can also suffer from undesired drifts and light intensity loss that can lead to measurement errors.

A recent approach proposes the use of force sensitive resistors to provide feedback in neurosurgery robot tools. See, T. Chen, et al, "Novel, flexible and ultra-thin pressure feedback sensor for miniaturized intra-ventricular neurosurgery robotic tools," IEEE Transactions on Industrial Electronics, pp. 1-1, 2020. A number of these sensors are required to obtain complete measurements of the entire loading state of a robot, and the central lumen of these robots is reserved as passageway for surgical instruments. These constraints therefore lead to a challenge with respect to the placement and wire routing of sensors inside these small structures.

Commercially available sensors that can be made small enough for minimally invasive surgical devices include force sensitive resistors, piezoelectric sensors, capacitive sensors, inductive sensors, optical sensors, ultrasonic sensors, magnetic sensors, electromagnetic (EM) tracking systems, and electrical impedance tomography sensors. While the sensors themselves can be small, the sensors require either wires or additional electronics to communicate data. Additional electronics are required for wireless communication, as sensor outputs require encoding for wireless communication. Additionally, these sensors require a power or light source, which makes them unsuitable for very small robotic instruments or in constrained environments.

Some wireless force sensors have been proposed. One type uses LC resonant circuits. C. Li, et al, "Review of research status and development trends of wireless passive 1*c* resonant sensors for harsh environments," Sensors, vol. 15, no. 6, pp. 13 097-13 109, 2015 However, these require a close interrogation distance between the sensor and the readout circuits-on the order of magnitude of a centimeter. The LC resonant sensors are also easily affected due to misalignment, noise from the environment, and cross-talking among elements. Q.-A. Huang, et al, "Lc passive wireless sensors toward a wireless sensing platform: status, prospects, and challenges," Journal of Microelectromechanical Systems, vol. 25, no. 5, pp. 822-841, 2016.

Another type of wireless sensor uses electromagnetically soft materials. E. L. Tan, et al, "A wireless, passive strain sensor based on the harmonic response of magnetically soft materials," Smart Materials and Structures, vol. 17, no. 2, p. 025015, 2008. These require multiple large coils in close proximity to the sensor, which is not practical for most applications in confined spaces.

Wave backscattering has been used to sense binary contact information, i.e., contact or a lack of contact. See, e.g., S. Pradhan, et al, "Rio: A pervasive rfid-based touch gesture interface," in Proceedings of the 23rd Annual International Conference on Mobile Computing and Networking, 2017, pp. 261-274; H. Li, et al, "Idsense: A human object interaction detection system based on passive uhf rfid," in Proceedings of the 33rd Annual ACM Conference on Human Factors in Computing Systems, 2015, pp. 2555-2564. Binary information is insufficient for many force sensing applications, including for sensitive minimally invasive surgical tools.

A SAW (Surface Acoustic Waves) based strain sensor relies on backscattering and has been proposed to sense analog forces. H. Li, et al, "A miniature layered saw contact stress sensor for operation in cramped metallic slits," Instruments and Experimental Techniques, vol. 61, no. 4, pp. 610-617, 2018; X. Yi, et al, "Passive wireless smart-skin sensor using rfid-based folded patch antennas," International Journal of Smart and Nano Materials, vol. 2, no. 1, pp. 22-38, 2011; T. T. Thai, et al, "Design of a highly sensitive wireless passive rf strain transducer," in 2011 IEEE MTT-S International Microwave Symposium. IEEE, 2011, pp. 1-4; J. Humphries and D. Malocha, "Passive, wireless saw ofc strain sensor," in 2012 IEEE International Frequency Control Symposium Proceedings. IEEE, 2012, pp. 1-6. These sensors use a small slit. The devices sense the elongation caused by strain along the length of the sensor, by sensing the antenna's resonant frequency. Basically, these devices use the antenna as the sensor, since due to applied strain the antenna elongates which changes its resonant frequency. The resonant frequency is then measured by estimating the amplitude variation across frequencies. Sensitivity to small forces is limited by the sensing method and antenna distortion can lead to multipath interference.

A recent advance was provided by PCT Published Application PCT/US2022/023952 (Publication Number WO2022221129). The wireless force sensor includes a flexible structure supported opposing a rigid structure with a gap between the flexible structure and the rigid structure. Contact traces on opposing surfaces of the flexible structure and the rigid structure form transmission lines. The contract traces are aligned to contact when a force is applied the flexible structure to cause contact between the traces on the opposing surfaces. Radio-frequency switches modulate a reflected signal from the transmission lines. An antenna receives an interrogation signal transmits the reflected signal. The flexible structure requires a relatively complex fabrication and limits miniaturization. depended on the change in phase due to applied force on a sensor. Sensing was based upon the total travel length of the input wave of the interrogation signal, which limited miniaturization of the sensor. The model between the phase and the force used the bending mechanism of the top layer. The model is not optimal for multiple contact points between the top and the bottom layers. In certain environments, contaminants can infiltrate the gap and interfere with or prevent sensor performance.

SUMMARY OF THE INVENTION

A preferred embodiment provides a deformable passive force sensor that induces a change in an interrogation RF signal present on a conductive connection to produce a changed reflective signal and an ID circuit that responds with an ID and the changed reflective signal.

DETAILED DESCRIPTION OF THE PREFERRED EMBODIMENTS

Figure 1:
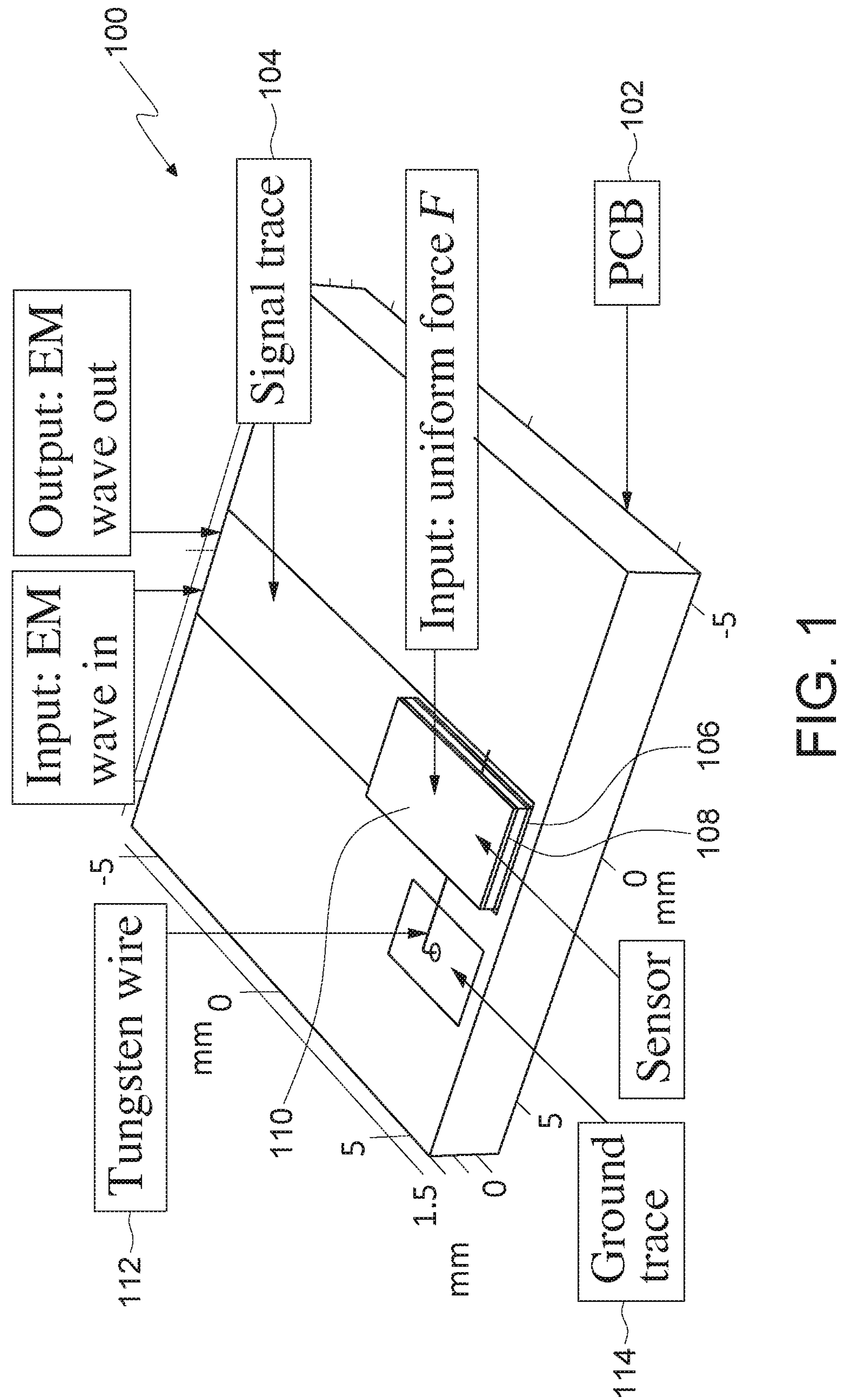
FIG. 1 is a schematic diagram of a preferred embodiment force sensor of the invention.

A preferred embodiment provides a force sensor that transduces contact force information into wireless analog signal changes, which can be read by a wireless reader. The reader first transmits an RF signal, which the sensor backscatters with changes, and the reader receives back the changed signal. A preferred sensor can be attached to an object or robot, like a sticker, and uses a phase changed signal. A preferred sensor can be powered via an RF energy harvester, and thus allows the sensor to be "batteryless". The lack of need for a local battery source is a key advantage in many applications, including force sensing applications to surgical robots An example sensor of the invention is supports wide-band frequencies, e.g. up to 3 GHz. Experiments demonstrated force sensing wirelessly in different environments, including in-body like, and demonstrated force accuracy of 0.3 N and contact location accuracy of 0.6 mm.

A preferred sensor includes or consists of top and bottom layer with a conductive material (copper) and the middle layer with a dielectric material (Ecoflex 00-30). A wire between the top and bottom layers is grounded, and the bottom layer contacts a signal connection, such as an RF signal trace or a conductive connection to an RFID circuit, on a substrate. Deformation of the sensor causes a change in capacitance and a measurable determinate change in phase of an RF signal when the sensor is interrogated with an RF signal that it reflects with an altered phase.

Specifically, the application of force to the top layer causes deformation of the whole sensor. The deformation changes capacitance and therefore impedance of the sensor causing a phase shift between an interrogation RF signal and a response signal that is caused by wave backscattering. The magnitude of the phase shift is correlated to the force applied and therefore can be used to measure the force applied to the sensor. This allows greater miniaturization compared to prior deformable beam sensor discussed in paragraph [0016] above, and the present sensor permits additional applications, particularly in medical tools which require smaller sensors. Eliminating the air gap also prevents any contact between the top and the bottom layer, which provides for more exact and repeatable fabrication and force model accuracy. Preferred sensors are implemented upon a wireless flexible PCB, creating compatibility with existing medical tools.

Dimensions can be very small. An example experimental sensor had a height of ~0.1 mm and the capacitor portion of the sensor was ~2 mm×~4 mm in width and length. The wire had an ~20 μm diameter. Commercial semiconductor fabrication techniques can easily provide smaller or larger sensors. Example experimental sensors demonstrated a sensing range of 0-6 Newtons with a Root Mean Square (RMS) error of 0.17 N, on average, and demonstrated wireless compatibility in a range of frequencies adapted for use inside the human body.

Sensors of the invention can be mounted on medical tools such as on a distal/lead surface of an endoscope. An additional example application is to the top of a medical gripper, tweezer, forceps, or clamp. The sensor can provide valuation information to a surgeon as to how a particular tool is interacting with the anatomy to which it is being applied.

Sensors of the invention can be integrated with RFID circuits. A preferred application for an RFID circuit with a sensor(s) of the invention is to package handling and/or transport. The sensor(s) can be applied to a surface(s) of the package and be used to weigh packages when placed on a rigid surface or to sense and record forces applied to a package surface(s).

Preferred embodiments of the invention will now be discussed with respect to experiments and drawings. Broader aspects of the invention will be understood by artisans in view of the general knowledge in the art and the description of the experiments that follows.

FIG. 1 shows a preferred embodiment sensor 100. The sensor 100 includes a substrate 102. An RF signal trace 104 that serves as an RF connection is supported by the substrate. A bottom capacitor conductive layer 106 in contact with the RF signal trace 104. A deformable dielectric 108 separates the bottom capacitor conductive layer 106 from a top capacitor conductive layer 110. A conductive wire 112 is between the top 110 and bottom 106 capacitor conductive layers and in contact with the top capacitor conductive layer 110. The conductive wire 112 is grounded to a ground contact 114 of the substrate. The conductive wire has a diameter preferably has a very small diameter, e.g. ≤15 μm, such as ~10 μm or ~5 μm.

Figure 2:
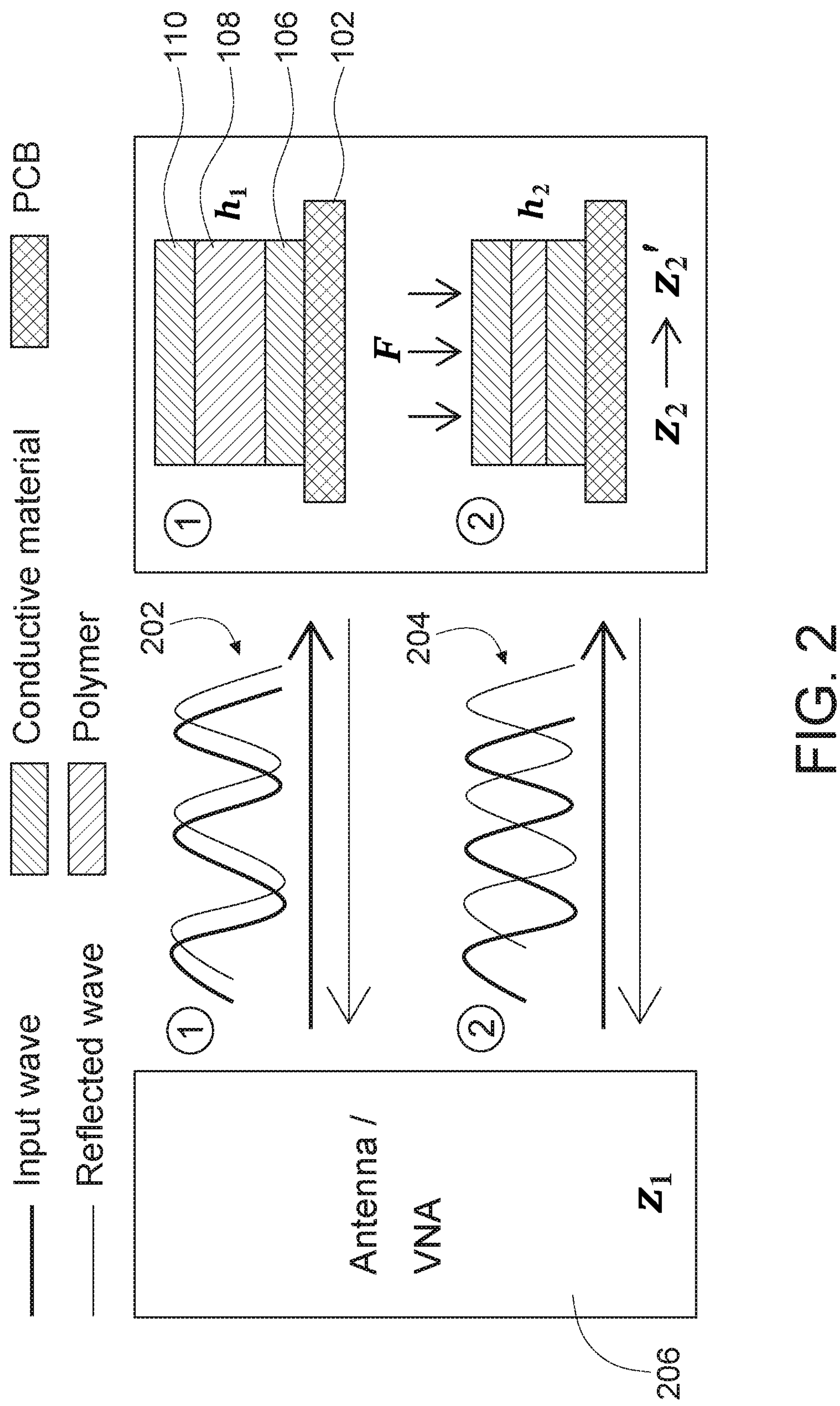
FIG. 2 illustrates how the sensor of FIG. 1 relies on a change in capacitance, and therefore impedance, to convert an applied force into an analog signal shift, such as a phase shift.

FIG. 2 illustrates how the sensor 100 relies on a change in capacitance, and therefore impedance, to convert an applied force into an analog shift, such as a phase shift. As a force is applied, the deformable dielectric layer 108 deforms and brings the top 110 and bottom 106 capacitor conductive layers closer together, leading to a change in the impedance, which results in a change in the phase of a reflected RF signal. The initial capacitance of the sensor at steady-state is $$C = \epsilon\frac{A}{d},$$

where $\epsilon$ is the dielectric permittivity, A is the surface area of the top 110 and bottom 106 capacitor conductive layers, and d is the distance between them defined by the deformable dielectric 108. As a force is applied to the sensor 100, the deformable dielectric 108 deforms and brings the top 110 and bottom 106 capacitor conductive layers closer together, leading to an increase in the sensor capacitance. Hence, the sensor capacitance is a function of applied force, denoted as C(F). From an RF perspective, this change in capacitance leads to a change in the sensor impedance, given by $$Z = \frac{1}{j\omega C(F)},$$

where $\omega=2\pi f$, $f$ is the wave frequency, and F is the force applied. This change in impedance results in a change in the phase of the wave, since $$S_{phase} = 2\tan^{-1}\left(\frac{1}{50\omega C(F)}\right).$$

Therefore, the external force causes a phase difference between the transmitted and reflected wave, as illustrated by differences between an interrogation waveform 202 and a reflected waveform 204. The interrogation waveform 202 and reflected waveform 204 can be respectively sent and received by a reader device 206 that includes an RF antenna.

Experimental Fabrication

Figure 3:
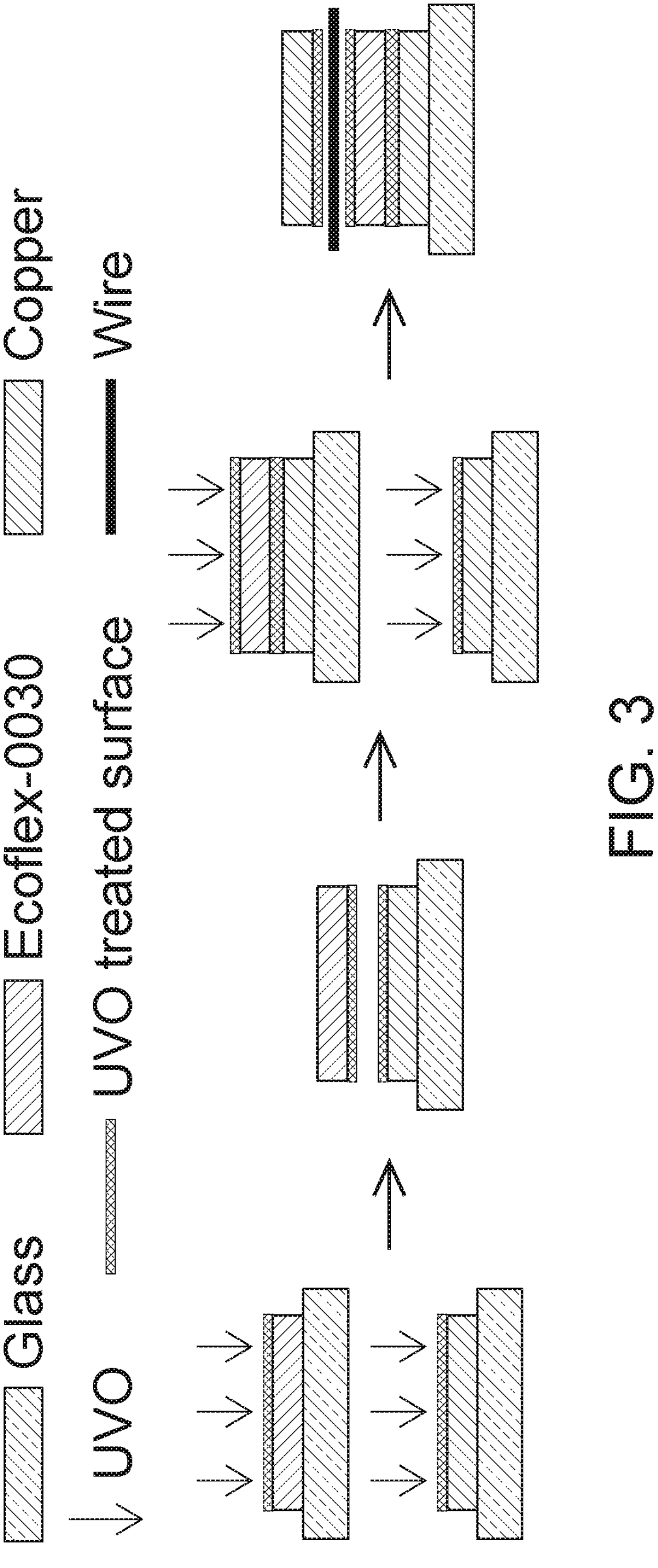
FIG. 3 illustrates an experimental fabrication process used to form sensors consistent with the sensor of FIG. 1.

FIG. 3 illustrates an experimental fabrication process used to form sensors consistent with the sensor 100 of FIG. 1. The materials used in the fabrication and the following description are exemplary preferred materials, and the dimensions provide a non-limiting example as the present sensors can be made larger or smaller to suit particular applications. In addition, standard semiconductor fabrication techniques including material deposition and patterning can be used to form sensors 100 of the invention.

In FIG. 3, a first step in the experimental process is to fabricate each component of the sensor, including the copper layers that serve as the top 110 and bottom 106 capacitor conductive layers and the polymer layer that serves as the deformable dielectric 108 layer. A DCH-355-3 Laser (Photonics Industries International, Inc.) was used to laser cut the 0.1 mm thick copper sheets into the desired dimensions (2 mm×4 mm). To prepare the polymer layer, Ecoflex 0030 part B was pre-mixed thoroughly for 30 seconds and then combined with a weight ratio of 1:1 with part A. After mixing for 3 minutes, the mixture was vacuum degassed at −1 Bar for 5 minutes. The mixture was then blade coated with a height of 0.2 mm on a glass slide. This polymer layer sat at room temperature for 4 hours and was then post-cured in 80° C. for an additional 2 hours to allow it to reach its maximum performance properties.

The next step is to combine the layers to form the full sensor. To remove a variety of contaminants from surfaces and increase adhesion between the metal and polymer layers, every interface was UV/Ozone (UVO) treated for 60 seconds (UVO-Cleaner Model 42, Jelight Company, Inc.). One side of a pre-cut copper piece and one side of the cured Ecoflex 00-30 were UVO treated. Ecoflex-0030 was then cut to meet the desired size specifications and placed onto the UVO-treated bottom copper layer with the UVO-treated surfaces facing each other. The other side of the Ecoflex 00-30 layer and the top copper layer were then UVO treated. Finally, a 8 mm long tungsten wire with a diameter of 20 μm was placed across the top of the Ecoflex 00-30, and the top copper layer was placed on top of the wire with the UVO-treated surface facing down. The fabricated sensor, was left to sit for 2 hours at room temperature to ensure a strong adhesion between the layers.

The fabricated sensor was then mounted onto the PCB with the tungsten wire side facing up. Since the maximum use temperature of Ecoflex 00-30 is 232° C., solder paste with a melting point of 219° C. was used to prevent deformation of the polymer. The bottom copper layer was soldered onto the signal trace of the PCB and the tungsten wire to the ground trace.

It is preferable to pre-stretch silicone rubbers to obtain consistent mechanical properties. Pre-stretching should be conducted progressively over multiple cycles as the maximum stretch level rises. 20 initial pre-stretch cycles provided the most consistent performance.

Experimental Simulation

The sensor 100 of FIG. 1 was modeled with an end-to-end Finite Element Analysis (FEA) simulation that models both the mechanical and RF components of our sensor and that can be used to determine a set of sensor design parameters for a given application. COMSOL Multiphysics was used to simultaneously capture the sensor's mechanical behavior-using the Solid Mechanics module and the phase shift between a transmitted and reflected wave using the RF module.

Mechanical Component: Ecoflex 00-30 was selected for the dielectric polymer layer due to its ability to deform under applied loads while not yielding or fracturing under the mechanical stress level experienced. To simulate the non-linear hyperelastic mechanical behavior of Ecoflex 00-30, the Yeoh model was used with $C_1$=17 kPa, $C_2$=−0.2 kPa, $C_3$=0.023 kPa [23]. The Ecoflex 00-30 was considered to be nearly incompressible and the initial bulk modulus used in our simulations was calculated using the relationship $$K = \frac{E}{3(1-2v)},$$

with a Young's modulus E=125 kPa [24], and a Poisson's ratio v=0.49. We mounted them onto a PCB transmission line that was integrated into our simulation. We note that such a PCB can easily be made smaller and flexible to increase the compactness of the overall sensor and to ease the integration, for example, with surgical robots.

RF Component: In order to simulate the wave backscattering capabilities of the sensor, we must excite it at a given RF frequency and observe the phase of the reflected signal. We choose a frequency of 900 MHz among the possible sub-1 GHz frequency bands because it has been widely used for in-vivo wireless backscatter sensing and has been shown to work robustly even when the signals go through multiple tissue layers. The PCB was selected to have a standard 501 impedance and implements a 900 MHz matched microstrip line. The top copper layer of the sensor is connected to the ground trace of the PCB with a 20 μm diameter tungsten wire, and the bottom copper layer of the sensor is placed directly onto the signal trace of the PCB.

Figure 4:
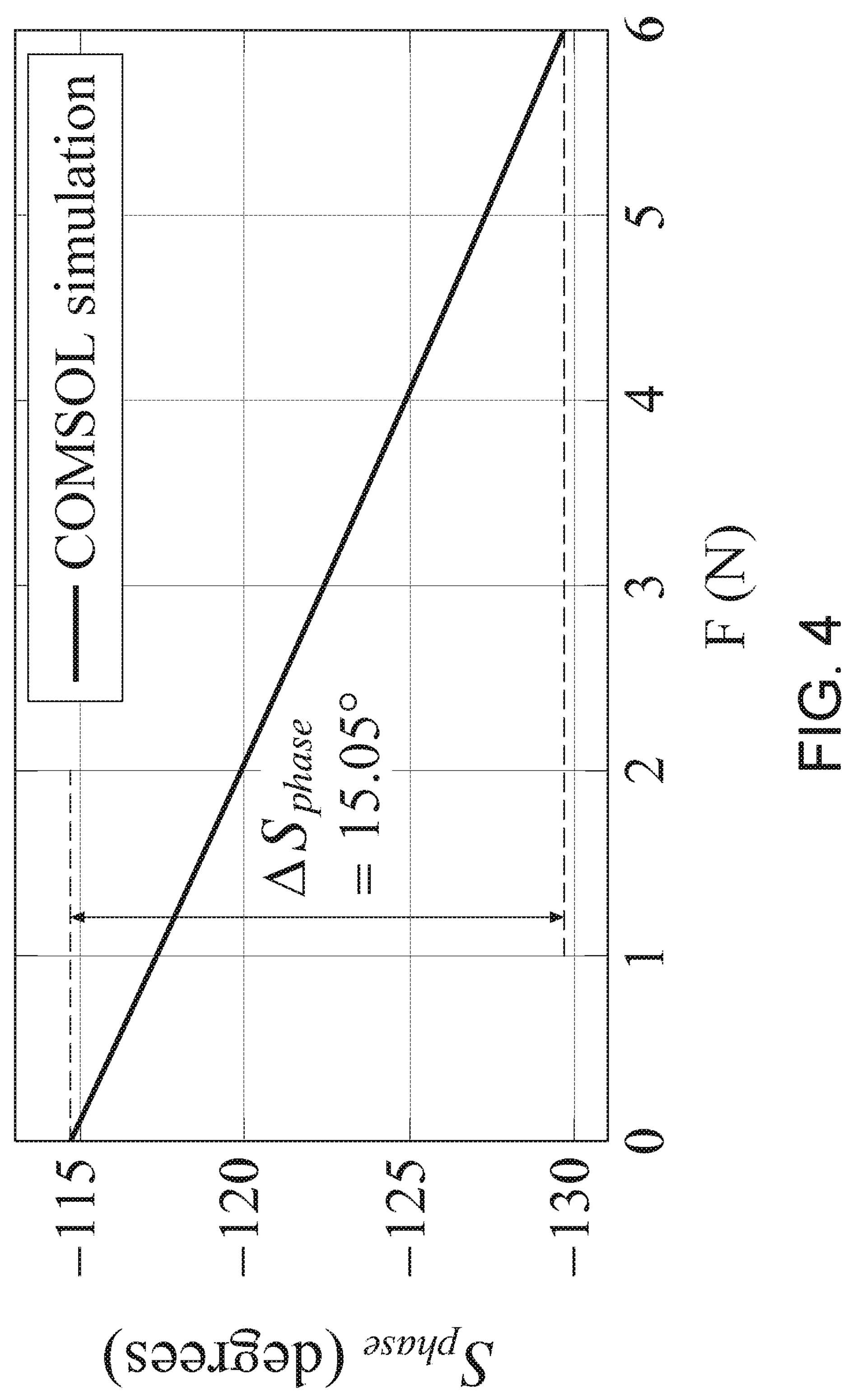
FIG. 4 shows COMSOL simulation results for the sensor of FIG. 1 with selected example design parameters.

FIG. 4 shows COMSOL simulation results for the sensor 100 with the selected design parameters. As the force applied to the sensor increases, the phase of the reflected wave, which travels along the signal trace of the sensor, decreases.

Electromagnetic waves propagate along the signal trace 104. Once they reach the capacitor portion of the sensor, they are reflected and travel back along the signal trace. These signal reflections are typically characterized by the reflection scattering parameter $S_{11}$. The magnitude, $S_{mag}=|S_{11}|$, of the signal must lie between 0 and −1 dB to ensure that the majority of the input wave is backscattered. The phase, $S_{phase}=\angle(S_{11})$, is used as our main metric to evaluate the sensor performance across the various sensor designs assessed. Indeed, a large phase shift over the range of applied forces leads to a higher sensitivity and resolution of the applied force magnitude estimation.

Parameter Selection: Once both the mechanical and RF components of the sensor are fully set up, the final step is to solve for a set of design parameters that will result in sufficient phase change over the force range required for the particular application. Given that the mean of the average of measured forces has been reported to range from 0.04 N to 5.70 N for different surgical specialties—including ophthalmology, vascular surgery, neurosurgery, cardiothoracic surgery, general surgery, and urologic surgery, this provides a sensing range valuable for tools used in such procedures.

To understand the effects of varying each design parameter on the sensor performance, a range and step size was first selected for each parameter as follows: the thickness of copper and Ecoflex 00-30 layers were increased from 0.1 mm to 0.5 mm with a step size of 0.1 mm, and the width and length of the sensor were increased from 1 mm to 5 mm with a step size of 1 mm. Designs were then simulated under applied loads in the range of 0 N to 6 N with a step size of 1 N, resulting in the following general trends between the design parameters and scattering parameters. Overall, decreasing each design parameter resulted in minimal changes to the $S_{mag}$ value, and all designs resulted in ranges of $S_{mag}$ between 0 dB and −1 dB. In addition, decreasing each design parameter led to an increase in the range of $S_{phase}$ While maximizing this range of $S_{phase}$ over the range of applied forces is desirable to enable higher sensitivity and resolution, the manual fabrication techniques used set a lower limit on the feasible design parameters. Therefore, the following set of values was chosen for the final sensor dimensions: 0.1 mm for the copper thickness, 0.2 mm for the Ecoflex 00-30 thickness, 2.0 mm for the sensor width, and 4.0 mm for the sensor length.

Simulation Results: Overall, this design showed a linear change in phase of 15.05° over 0 N to 6 N of force, as visible in FIG. 4. This full scale output would give the sensor a sensitivity of 2.51°/N. The resolution of the sensor depends on the resolution of the testing equipment. In a wired setting with a 0.01° resolution VNA (Vector Network Analyzer, E5071 C Agilent Technologies), the sensor resolution would be 4 mN. Considering the wireless compatibility of the sensor, the sensor resolution would be 0.4 N in a wireless setting with 1° resolution. Given that the sensor resolution should be at least one order of magnitude less than the force difference to be resolved (in order to reduce the effect of quantization error), such sensor resolutions would be sufficient for surgical applications that require force measurements of 0.04 N to 6 N and 4 N to 6 N, respectively.

Correlating Force to Phase Change for Experimental Sensors 1 and 2: A model was then computed for each sensor to estimate the force for a measured phase. A 2$^{nd}$ order rational was used and is given by, $$F(S_{phase,i}) = \frac{p_1 S_{phase,i}^2 + p_2 S_{phase,i} + p_3}{S_{phase,i}^2 + q_1 S_{hase,i} + q_1}$$

where the coefficients used for each sensor are given in Table I. RMS errors between the experimental model and the experimental data was 0.16 N and 0.18 N for sensors 1 and 2, respectively. In addition, the full-scale output of each sensor can be evaluated, and is found to be 27.77° and 25.93° for sensor 1 and sensor 2, respectively. Using the constructed sensor models, the sensitivity and resolution of each sensor was evaluated. for forces below 0.5 N and forces above 0.5 N. As shown in Table II, the sensitivity and resolution for sensor 1 were 23.83°/N and 0.42 mN for 0-0.5 N, and 2.88°/N and 3.47 mN for 0.5-6 N. The sensitivity and resolution for sensor 2 were 19.82°/N and 0.5 mN for 0-0.5 N, and 2.91°/N and 3.43 mN for 0.5-6 N. Overall, these resolutions are sufficient for many surgical applications.

The two sensors showed some slight differences in terms of RMS errors, full scale output, sensitivity, and resolution. These differences are likely due to variations of the manual fabrication process, including in the dimensions of each layer or in the geometry of the sensor during their assembly. In addition, due to possible imperfect parallelism between the indenter and the top surface of the sensor during evaluation, the applied force may not have been perfectly uniform or may have included shear components. A commercial fabrication process would eliminate such variation.

TABLE I

INTERPOLANT COEFFICIENTS OF THE EXPERIMENTAL MODEL FOR SENSOR 1 AND 2

| Coefficients | $p_1$ | $p_2$ | $p_3$ | $q_1$ | $q_2$ |
|---|---|---|---|---|---|
| $S_{phase, 1}$ | 1.058 | 214.5 | 10910 | 257.2 | 16680 |
| $S_{phase, 2}$ | 1.465 | 317.4 | 17230 | 264.6 | 17670 |

TABLE II

SENSITIVITY AND RESOLUTION OF SENSOR 1 AND SENSOR 2

| Force range | 0-0.5 N | | 0.5-6 N | |
|---|---|---|---|---|
| and metric | Sensitivity | Resolution | Sensitivity | Resolution |
| Sensor 1 | 23.83°/N | 0.42 mN | 2.88°/N | 3.47 mN |
| Sensor 2 | 19.82°/N | 0.5 mN | 2.91°/N | 3.43 mN |

Sticker-Like Force Sensors

Preferred embodiments use a substrate 102 (FIG. 1) that is flexible and thin. A flexible and thin substrate is useful in many applications, for example for monitoring forces applied to packages and as an implant to monitor forces applied to human joints. An RFID circuit is integrated with a sensor 100, so forces can be sensed with a reader that is also able to uniquely identify the sensor 100 using RFID technology.

Figure 5:
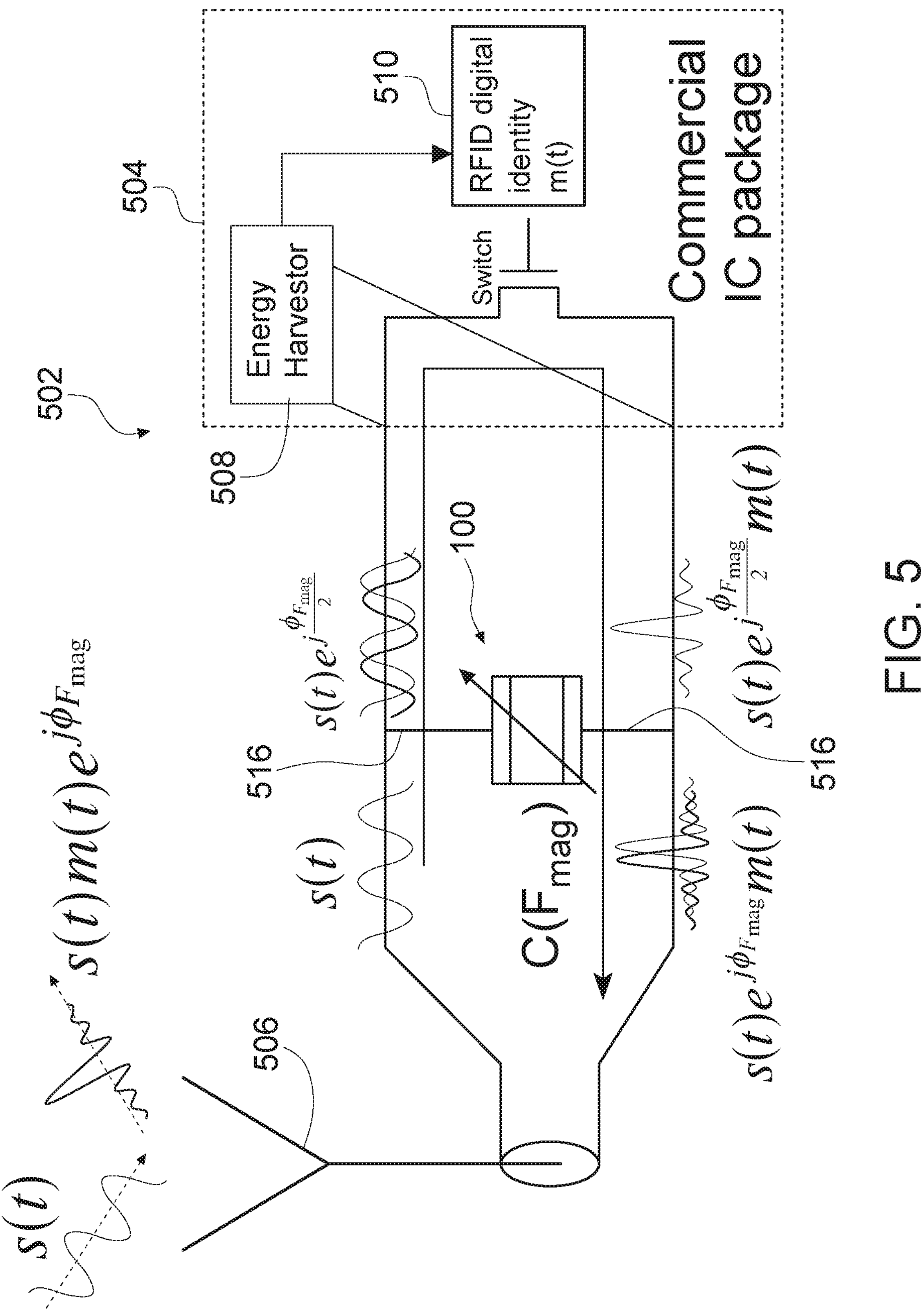
FIG. 5 shows a preferred integrated sensing device that includes a sensor of FIG. 1 packaged with an RFID circuit and an antenna.

FIG. 5 shows a preferred integrated sensing device 502 that includes a sensor 100 of FIG. 1 packaged with an RFID circuit 504 and an antenna 506. The RFID circuit 504 can include an energy harvester 508, e.g., a solar cell or magnetic antenna, and an ID circuit 510 that uniquely identifies the sensing device 502.

The sensor 100 is placed in between the antenna and RFID IC 504. The RFID IC 504 is a single port device that does not receive and pass signals through. The sensor 100 passes the signals through and reflects phase changes to produce a phase modified signal with an RFID signal. Conductive connections 516, such as wires or circuit interconnects, provide a connection of the sensor 100 to the RFID IC 504.

Analog phase changed data of the sensor is communicated over a digital identify of the RFID IC 504. A remotely located reader is able to identify signals from the RFID IC 504 and also receives backscattered phase changes when as the sensor 100 is placed in parallel connection (shunt mode) between the RFID IC 504 and the RFID antenna 506. The sensor 100 creates minimal changes in amplitude by affecting only the signal phase, and thus preserves the ID signal and range of the RFID IC 504.

The entire sensing device 502 can be paper thin, the relationship between deformation of the deformable dielectric 108 and the phase change is non-linear. The non-linear relationship can be exploited to operate in a sensitive region where measurable phase changes are obtained even when the thickness only changes by a very small amount, less than 0.09 mm, e.g. 0.06 mm, which is even lesser than a typical thickness of paper strip of around 0.1 mm.

Modelling of Sticker-Like Force Sensors

Because of the non-linear relationship between capacitance and phase change, the capacitive sensor can be designed to operate in a sensitive'range, where the phase shifts are large and measurable. One can tune the capacitance value such that the non-linear equation sensitivity is exploited in a desired frequency band, e.g., the 900 MHz band of commercial UHF RFIDs. To obtain this sensitivity tuning, the sensor 100 should have a correctly designed nominal value at zero force, denoted by C(F=0), denoted as $C_0$. $C_0$ basically governs if the sensor's phase change is sensitive to a chosen RF frequency ω, and the non-linear relationship is given as:

$$\Delta\phi(F_{mag}) = 2\tan^{-1}\left(1/50\omega C(F = F_{mag})\right) - 2\tan^{-1}\left(1/50\omega C_0\right)$$

where $\Delta\phi(F_{mag})$ is the phase change brought by $F_{mag}$ force which creates $C(F_{mag})$ capacitance. Due to presence of $\tan^{-1}$, the phase to capacitance is not a simple linear relationship unlike the phase to distance relation before This non-linear relationship is derived from reflection coefficient calculations Γ, assuming a transmission line matched to 50Ω as shown in FIG. 5 (*a*). Basically, the reflected signals from the capacitor are multiplied by the reflection coefficient F and then backscattered by the antenna. Due to the purely capacitive nature of the sensor impedance, Γ has the form of $$\frac{a - bj}{a + bj}$$

and hence can be rewritten in polar form as $$\frac{\sqrt{a^2 + b^2}\, e^{-j\tan^{-1}(b/a)}}{\sqrt{a^2 + b^2}\, e^{j\tan^{-1}(b/a)}}.$$

Thus, Γ has unit magnitude and a phase term given by $2\tan^{-1}$ (b/a), and hence the phase change computes to the non-linear relationship.

Figure 6A:
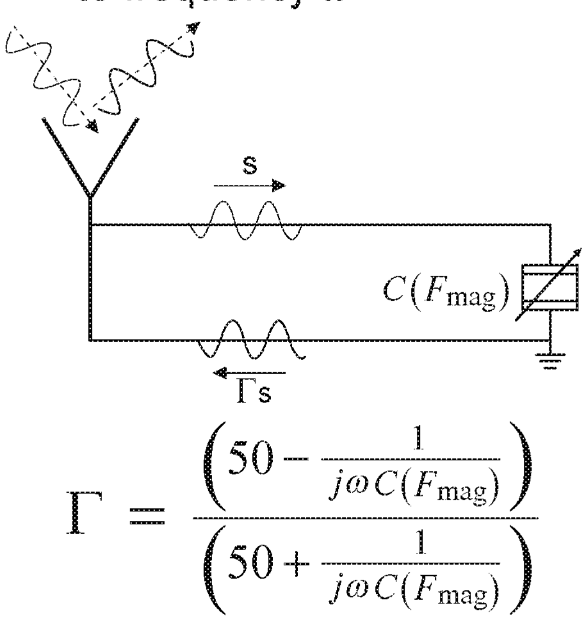
FIGS. 6A-6C show (A) Reflection coefficient equation (B) How different values of $C_0$ affect $\Delta\phi$, plotted at a constant $\Delta C=0.75\ C_0$ (C) How different $\Delta$ C affect maximum phase shift attainable, plotted at constant $C_0=1$ pF for a sensor of FIG. 1
Figure 6B:
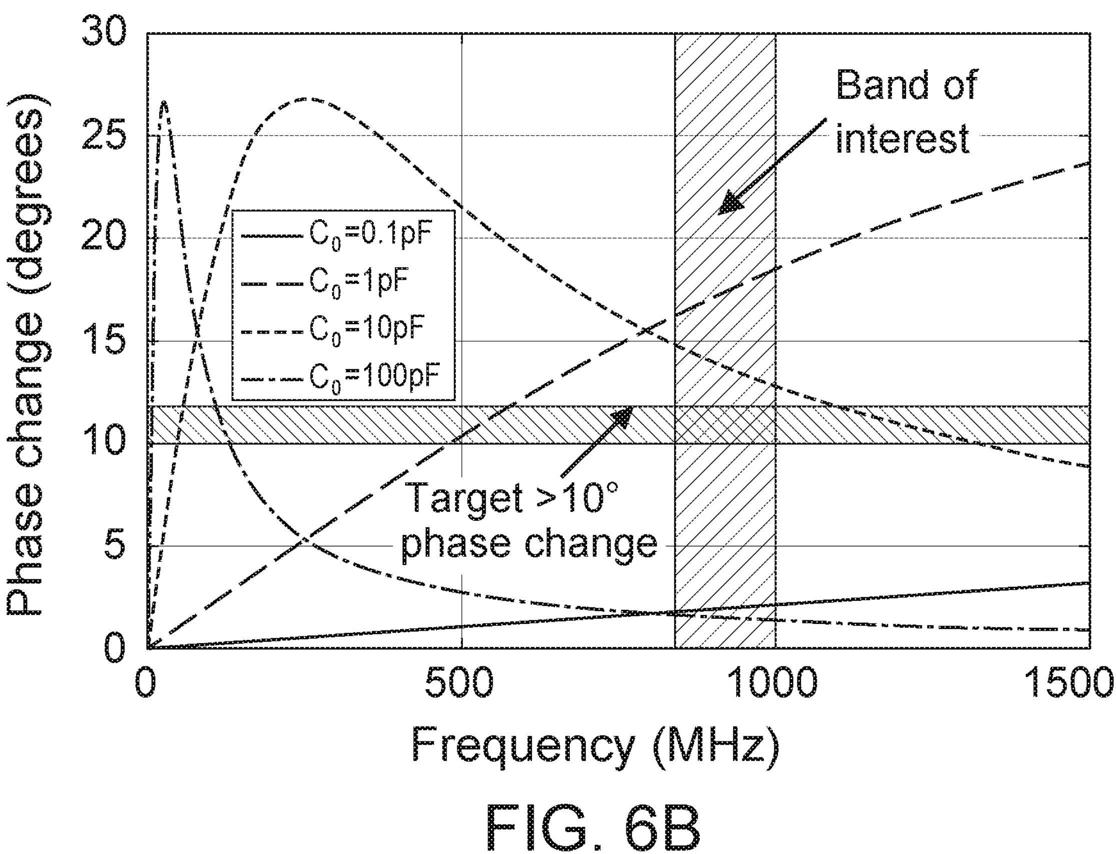
Figure 6C:
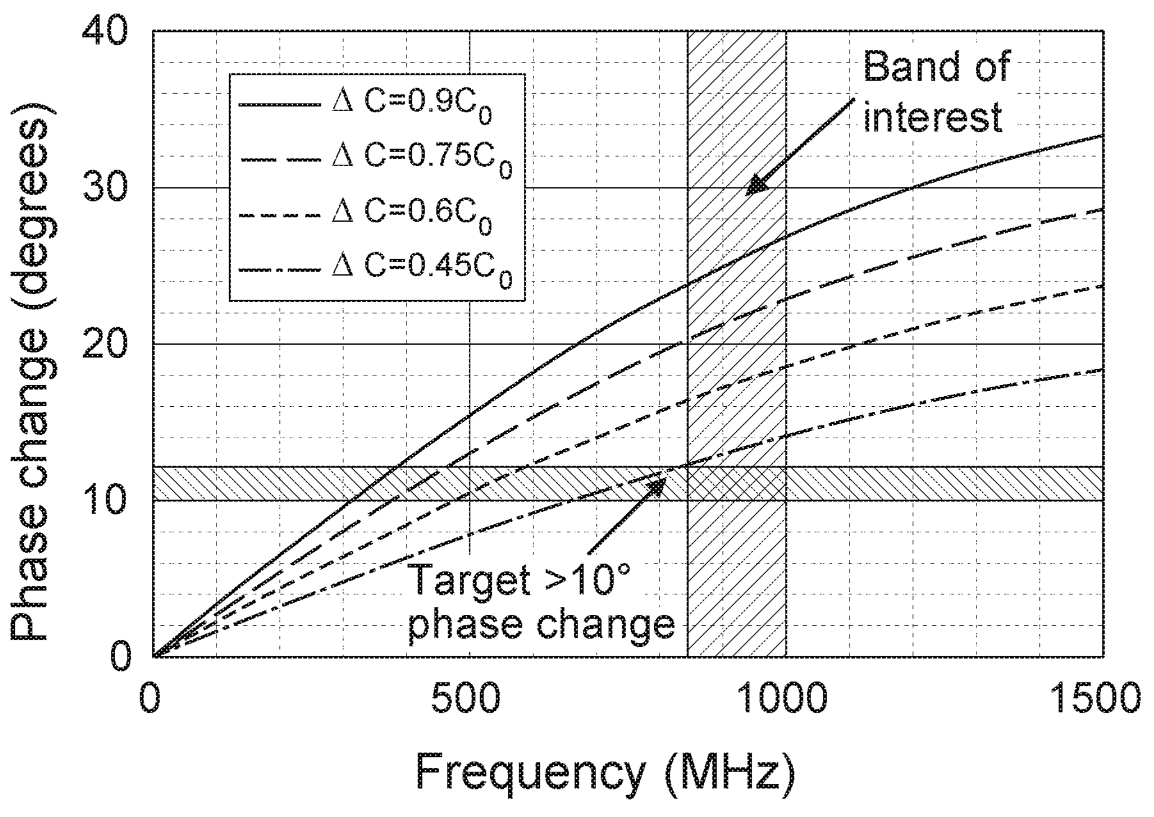

FIGS. 6A-6C show (A) Reflection coefficient equation (B) How different values of $C_0$ affect Δϕ, plotted at a constant $\Delta C=0.75\ C_0$(C) How different Δ C affect maximum phase shift attainable, plotted at constant $C_0$=1 pF.

An example is used to design a sensor tuned to 900 MHz. From FIG. 6B-6C, $C_0$ needs to be between 1-10 pF and ΔC needs to be greater than 0.45 $C_0$. Nominal capacitances can be approximated to be $$C = \frac{A\epsilon_r}{d}$$

as under no force the sensor is essentially a parallel plate capacitor, with a Ecoflex 00-30 polymer dielectric layer sandwiched between two copper layers. The choice of dimensions of the sensor gives a rough initial capacitance of 1 pF, with $$C = \frac{A\epsilon_r\epsilon_0}{d} = \frac{8*10^{-6}*2.8*8.85*10^{-12}}{0.2*10^{-3}} = 0.99pF,$$

with a 2 mm×4=8 $mm^2$ area sensor with 0.2 mm thick dielectric layer, and the dielectric constant=2.8 for the chosen Ecoflex 00-30 polymer.

Unlike the parallel plate approximation of $C_0$, ΔC does not have a close form expression as it requires calculation of the mechanical deformations caused by force. Additionally, the sensor geometry under force is not as simple and becomes that of a squished polymer layer, which affects capacitance calculations. Hence, ΔC computation requires solving both the structural mechanics equations to compute the polymer deformation and then use the deformed geometry for Maxwell equations to compute the effective capacitance of the squished sensor. As this is not analytically straightforward, an FEM simulation framework, COMSOL Multiphysics 6.0 is used simulate the sensor capacitive effect under deformation.

COMSOL takes the sensor geometry as an input and meshes the geometry to form small elements where the differential equations can be solved numerically, and the final results are then collated across each mesh element's solution. We use COMSOL Structural Mechanics module for the non-linear elastic modeling of the polymer layer and via COMSOL AC/DC module, we can excite the sensor with an AC voltage source and compute the obtained current as affected. This computation can be done with the sensor being under the effect of various levels of force applied to the sensor. Then, by simply taking voltage to current ratio we can obtain the sensor impedance as a function of force, $Z(F_{mag})=V(F_{mag})/I(F_{mag})$. Hence, this allows the computation of sensor impedance versus force readings. Since the resistive component of the impedance is almost 0, and the reactive component is negative, it shows that the sensor is almost purely capacitive. A force curve showed that the observed capacitance of the ecoflex sensor ranged from 1 to 1.65 pF as the force on the sensor increases from 0 to 6 N. This meets a design targeted with the nominal capacitance of about 1 pF and ΔC=0.65 $C_0$>0.45 $C_0$.

RF level simulations shows that the sensor can be integrated easily with RFID ICs. Thru-mode responses of the sensor were simulated in hardware with 2-port simulations in COMSOL with the sensor interfaced on a PCB which implements a 50Ω transmission line. Fabricated prototypes confirmed the sensor's thru-mode response with actual hardware measurements.

Reading Forces (Phase Shifts) Via RFID Readers

When a wireless force sensor of the invention is interfaced with RFID, it reflects back a digital identifiable phase-shifted signal. The digital identity from the sensor is given via the EPC ID number of the RFID IC integrated with the sensor. Then, the RFID reader can observe the channel estimates of the particular tag given by the EPC ID and calculate sensor phase jumps to estimate applied forces.

Per FCC guidelines, the readers need to change their frequencies after every 200 milliseconds to avoid interference with other readers in the environment. The readers introduce a random phase offset due to hopping, as the PLL locks to a different frequency, and this inadvertently shows up as phase jumps in the phase calculations. However, using the Low-Level Reader Protocol (LLRP) for RFID readers, one can isolate the per channel phases since the readers give a channel index for each phase readings, and the phases on a particular channel remain stable across time and do not show these jumps. Hence, this allows computation of differential phase jumps per channel, which computes the phase shift value caused by force per channel. Using differential phase automatically offsets the fixed phase jumps across channels and gives a consistent phase jump measured across multiple RFID channels. In addition to hopping-based phase jumps, some RFID readers have phase readings that show 180° shifts, which can be filtered out by detecting the phase jumps>170°. Since the force information is encoded in phase jumps which do not exceed jump magnitude of 20°, the filtered phase jumps can be converted to force data. Averaging the phase jumps recorded across each of the 50 RFID channels between 900-930 MHz can also be used to get clean phase jump readings from an RFID reader.

Such multi-channel RFID phase averaging makes the sensing robust to dynamic environmental multipath since each channel records different phase jumps stemming from the dynamic multipath because of its moving nature. However, the phase jump from the sensor remains consistent across the channels. Thus, upon doing multi-channel averaging across these 50 distinct channels, the multipath phase jumps get averaged out to near zero, and the sensor phase jump remains at its consistent level. Further, the dynamic multipath phases being different across different RFID channels allows filtering out fake positive phase changes by profiling the standard deviation of phase changes observed across multiple channels. A phase shift from dynamic multipath would show large standard deviation across the channels as compared to that from force sensor. The averaged and filtered phase changes do not fluctuate due to deformation of the sensor.

Such averaging gives phase measurement accurate to 0.5° in static scenarios which leads to a sensor resolution of 0.2 N (Since 0-6 N shows approximately 0-15° phase jump and hence resolution would be $$\frac{6}{15}*0.5 = 0.2\ N.$$

When there is dynamic movement in the environment, the measurements are roughly accurate to 0.8-1° (depending on extent of movement) which makes the resolution slightly higher to ~0.3-0.4 N which is still at sub-N levels.

Experimental Devices.

Fabrication

The sensor design consists of three layers: a conductive metal layer at the top and the bottom and a dielectric polymer layer in the middle. To fabricate the sensors, 0.1 mm copper strips are used as conducting layer. Depending on the maximum force to be read, the soft polymer can be either Ecoflex-0030 elastomer (<6 N), Neoprene 30 A rubber (<40 N) or carbon filled black rubber (<600 N). We fabricate the ecoflex and neoprene sensors with the thickness being 0.2 mm and 2.2 mm each, whereas the carbon filled rubber sensor is only in simulations. The thickness of rubber sensors is higher since these have higher dielectric constants, hence to keep similar area form factor the thickness has to increase (but still remains mm-scale).

To fabricate the ecoflex layer, we utilize a blade coating process to get 0.2 mm thick uniform, which then can be cut into a 2 mm×4 mm piece for the sensor. Neoprene rubber is commercially available as 2 mm thick layer, which can then be laser cut into the 2 mm×4 mm form factor. The copper plates are then stuck onto either side of the fabricated polymer layers. Before bounding the top side of the polymer layer, a commercially available tungsten wire filament with 20μ m diameter is placed on the polymer layer, so that the top layer can be electrically grounded to interface the capacitor in parallel to the RFID IC. The filaments are also flexible and bendable as a consequence of μ m form factor and can be twisted and flexed akin to human hairs.

Experimental Verification of RF Analog Phase Changes from Mm-Scale Sensor Via RF PCBs To implement the transmission line PCB, we design a microstrip line of 50Ω impedance at 900 MHz, that has a width of 2 mm so that the sensor can be directly soldered on it. The PCB that supports the microstrip line also has a small ground pad for soldering the tungsten wire filament. The signal traces are taken to the bottom layer using vias, where the line is terminated in two UFL connector pads. Using this PCB we can interface the sensor via RF cables to a VNA (Vector Network Analyser), a measurement device which mimics a wireless transmitter by exciting the sensor with 900 MHz signals and observing the reflected and transmitted signals, hence providing wired ground truth phase measurements. Further, we mount this sensor PCB on a load cell sensor, to provide ground truth force measurements. The placement of the UFL connectors on the bottom side of the sensor allows the actuator to apply forces on the top surface of the sensor without creating mechanical hindrance. Testing showed a phase doubling effect as the thru-mode to reflection-mode the phases double up from 8° phase shift to 16°. This was consistent with COMSOL simulations, since both simulations and hardware results show about 12 degree linear phase change. However, prototypes showed a non-linear part for lower forces (<1 N), which could not be modeled accurately via COMSOL's numerical computations. The non-linear response originates from the sensor, and is not an artefact from the PCB, since even the non-linear part doubles up from transmit to reflect mode, which is only possible if the phase originates from the sensor. This initial non-linear part is also repeatable across measurements, and in fact improves the sensor sensitivity in low force ranges.

RFID Integration with Sensor to Provide Digital Identity

Prototype sensors were interfaced with an RFID IC and a T matching network right after the sensor pad consistently with FIG. 5. The T matching network allows testing of different matching strategies for the RFIDs and this PCB basically acts as a test platform. The PCB was made in a flexible form factor, with a co-planar waveguide designed with characteristic impedance set to avoid need of a matching network. A spiral antenna that fit in a 1 cm×1 cm form factor was used. The antenna had around 10% radiation efficiency at 900 MHz, which is similar to existing works using 900 MHz antennas in the 1 cm×1 cm form factor. Miniaturizing further is also possible but would come with slightly reduced radiation efficiencies and a reduced range. We design sensor interfacing via a similar 1 cm*1 cm form-factor co-planar waveguide (also simulated in HFSS) with characteristic impedance matching the RFID IC. The co-planar waveguide can be miniaturized further to fit smaller antennas, but the size was kept consistent to antenna size for easier integration. Hence, the co-planar waveguide can be connected directly to the sensor+RFID IC without requiring a matching network. The co-planar waveguide and spiral antenna is implemented on a flexible PCB having polyimide substrate, which is 0.1"" mm thin, and flexible enough to bend and fit various curves.

Present sensors can also be mated with commercially available printed RFID stickers. These RFID stickers have a peelable RFIC which is stuck to the two ports of the RFID antenna. One can expose the antenna pads and then interface the sensor via two tungsten filaments, one connected to each of the copper layers directly onto the antenna pads. The sensor is interfaced again in parallel to both the RFIC and antenna, without actually requiring any additional PCB.

In summary, three separate implementations of the sensor were demonstrated. the first one interfaces the sensor via a rigid 50-Ω matched PCB to an RFID IC acting as a test platform. The second approach is to interface the sensor with a flexible PCB matched directly to RFID impedance with a PCB printed antenna, which reduces the form factor to serve the in-vivo applications. The third approach interfaces the sensor in a PCB-free standalone method to existing commercial RFID stickers, to better serve the ubiquitous applications.

Preferred Applications.

Applications include biological applications, as the sensors of the invention can be packaged in biocompatible materials. Other example applications include to package handling, package weighing, component monitoring, the vehicular industry for crash data, and many other applications. Some example applications are discussed next.

Orthopedic Implant Application

An ecoflex force sensor (shore hardness 0030) of the can provide force in the 0-6 N range, and second, neoprene rubber (shore hardness 30 A) sensor can provide force in a 0-40 N range. Neoprene is a stiffer polymer with higher shore hardness, which allows sensing of higher magnitude forces. Carbon black filled neoprene rubber allows sensing of even higher magnitude forces (0-600N), which can better provide orthopedic sensing. Simulation results with 0.45 mm thick carbon filled neoprene polymer provide phase change results over a range of about 15° for the higher (0-600)N force ranges with median errors <5% of the maximum force sensing range. For the carbon-black neoprene sensor, with maximum force of 600 N, 5% calculates to 30 N and this error of 30 N is acceptable norm for an orthopedic knee application.

Reading Forces from Multiple Sensors Concurrently

RFID MACs, for example utilizing the popular EPC Gen 2 protocol can acquire multiple tag readings via the same RFID reader. Observing the channel estimates permits determination of the applied forces on each of the tags sensed.

Packaging Application.

The present sensors can be applied to the outer surfaces of packages. The sensors can be used to detect weight, for example, as a package with one or more sensors on the bottom surface passes a weigh station with an RFID reader. This removes the need for specialized scales or weighing equipment.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A wireless force sensor comprising a deformable passive force sensor that induces a change in an interrogation RF (radio frequency) signal present on a conductive wire, trace or circuit interconnect to produce a changed reflective signal and an ID (identification) circuit that responds with an ID and the changed reflective signal, wherein the deformable sensor comprises a deformable passive capacitive force sensor comprising a deformable dielectric layer sandwiched between two conductive layers, the ID circuit comprises a digital ID circuit, and the changed reflective signal comprises a phase changed reflective signal on the wire, trace or circuit interconnect.

2. The wireless force sensor of claim 1, wherein the deformable dielectric layer comprises one of a polymer layer, an elastomer layer, a carbon filled rubber layer.

3. The wireless force sensor of claim 1, formed as a tag applied to an object.

4. The wireless force sensor of claim 1, having no battery or power source.

5. A wireless force sensor comprising a deformable passive force sensor that induces a change in an interrogation RF (radio frequency) signal present on a first conductive wire, trace or circuit interconnect to produce a changed reflective signal and an ID (identification) circuit that responds with an ID and the changed reflective signal, wherein the deformable sensor comprises a deformable passive capacitive force sensor, the ID circuit comprises a digital ID circuit, and the changed reflective signal comprises a phase changed reflective signal, wherein the deformable passive capacitive force sensor comprises:

a substrate supporting the conductive wire, trace or circuit interconnect;

a bottom capacitor conductive layer in contact with the conductive wire, trace or circuit interconnect;

a deformable dielectric separating the bottom capacitor conductive layer from a top capacitor conductive layer; and a second conductive wire, trace or circuit interconnect between the top and bottom capacitor conductive layers and in contact with the top capacitor conductive layer, the second conductive wire, trace or circuit interconnect being grounded to a ground contact of the substrate.

6. The wireless force sensor of claim 5, wherein one or both of the first and second conductive wire, trace or circuit interconnect comprises tungsten.

7. The wireless force sensor of claim 6, wherein the tungsten comprises a wire that has a diameter ≤15 μm.

8. The wireless force sensor of claim 5, wherein one or both of the first and second conductive wire, trace or circuit interconnect has a diameter of ~5 μm.

9. The wireless force sensor of claim 5, wherein the deformable dielectric comprises a polymer layer.

10. The wireless force sensor of claim 9, wherein the polymer layer comprises an elastomer.

11. The wireless force sensor of claim 5, wherein the deformable dielectric comprises a carbon filled rubber layer.

12. The wireless force sensor of claim 5, wherein the deformable dielectric comprises a carbon filled silicone rubber layer.

13. The wireless force sensor of claim 5, wherein the deformable dielectric comprises a carbon filled neoprene layer.

14. The wireless force sensor of claim 5, wherein the top and bottom capacitor conductive layers comprise copper.

15. The wireless force sensor of claim 5, comprising an RFID circuit on the substrate.

16. The wireless force sensor of claim 15, wherein a capacitor formed by the bottom capacitor conductive layer, the deformable dielectric, the top capacitor conductive layer, and the first and second conductive wire, trace or circuit interconnect is interfaced in parallel to both of an antenna and an IC of the RFID circuit.

17. A system including the wireless force sensor of claim 5, and a wireless reader, the reader comprising hardware to emit an excitation signal and receive a reflected signal and correlate the reflected signal to an amount of force on the deformable sensor.

18. The wireless force sensor of claim 5, wherein the substrate comprises a flexible substrate.

19. The wireless force sensor of claim 18, packaged in a biocompatible material.

20. A wireless force sensor comprising:

a substrate;

an RF (radio frequency) signal wire, trace or circuit interconnect supported by the substrate;

a bottom capacitor conductive layer in contact with the RF signal wire, trace or circuit interconnect;

a deformable dielectric separating the bottom capacitor conductive layer from a top capacitor conductive layer; and a ground wire, trace or circuit interconnect between the top and bottom capacitor conductive layers and in contact with the top capacitor conductive layer, the ground wire, trace or circuit interconnect being grounded to a ground contact of the substrate.

21. A wireless force sensor, comprising:

a substrate;

an RF connection to an antenna supported by the substrate;

a parallel plate capacitor with a deformable dielectric separating top and bottom conductive layers, the deformable dielectric being sandwiched between the top and bottom conductive layers; and the top and bottom layers interfaced with an antenna's signal and ground ports via a respective RF wire, trace or circuit interconnect on the substrate and a respective ground wire, trace or circuit interconnect on the substrate.

* * * * *